United States Patent [19]  [11] 4,384,014
Young  [45] May 17, 1983

[54] IMPREGNATION OF POROUS ARTICLES

[76] Inventor: Peter D. Young, Les Blicqs, St. Andrews, Guernsey, Channel Islands, Channel Islands

[21] Appl. No.: 308,550

[22] PCT Filed: Mar. 13, 1981

[86] PCT No.: PCT/GB81/00046
§ 371 Date: Oct. 1, 1981
§ 102(e) Date: Oct. 1, 1981

[87] PCT Pub. No.: WO81/02699
PCT Pub. Date: Oct. 1, 1981

[30] Foreign Application Priority Data

Mar. 14, 1980 [GB] United Kingdom ................ 8008718

[51] Int. Cl.³ .......................... C23C 13/08; B05D 3/00
[52] U.S. Cl. ..................................... 427/294; 118/50; 118/429; 427/295; 427/297; 427/353; 427/398.3
[58] Field of Search ............... 427/294, 295, 297, 353, 427/398.3; 118/50, 429

[56] References Cited

U.S. PATENT DOCUMENTS

| 2,612,443 | 9/1952 | Goetzel et al. | 118/50 X |
| 2,932,583 | 4/1960 | Grana | 427/295 |
| 3,448,719 | 6/1969 | Tate | 427/294 X |
| 3,701,676 | 10/1972 | Bader et al. | 427/295 |
| 3,969,552 | 9/1976 | Malofsky et al. | 427/295 |

Primary Examiner—Michael R. Lusignan
Attorney, Agent, or Firm—Oblon, Fisher, Spivak, McClelland & Maier

[57] ABSTRACT

The invention provides an in-line method of impregnating a porous article, particularly a metal casting, which comprises placing the article on a support, placing a cover thereover in sealing relation with support to define an impregnation chamber, applying a reduced pressure to the cover at the upper part thereof, admitting impregnant to the chamber until it at least covers the pores, allowing the pressure to rise to substantially atmospheric, removing excess impregnant from the chamber, and removing the cover from the support. Such a method permits impregnation using a conveyor line system.

11 Claims, 12 Drawing Figures

IMPREGNATION OF POROUS ARTICLES

BACKGROUND OF THE INVENTION

1. Field of the Invention

The invention relates to the sealing of pores in porous rigid articles, particularly metal articles such as metal castings and sintered metal products but also materials such as wood or inorganic materials such as brick, stone, or concrete. It is however important that the pores in the material are not so big as to permit leaching out of the impregnant. In a modification of the invention, the impregnant of the invention is used to impregnate materials such as paper and cloth.

2. Description of the Prior Art

The impregnation of metal castings with resins to seal porosity is a process which is well established. Porosity in castings is invariably inconsistent in size and shape, thus rendering the components unusable due to leakage. This is especially true where they are subjected to pressure. Apart from this well known cause for rejection of castings used in the motor industry there are many other problems caused by porosity including plating failures, "blow out" during stove enamelling, and sites for corrosion, entrapment of organic material and possible bacteria growth.

Generally, porosity can be divided into three types: through porosity, blind porosity and enclosed porosity. Through porosity causes leakage and is the type with which founders are primarily concerned. Blind porosity, having one entrance to the surface only, will not produce a leakage but can cause surface finishing problems through absorption of treatment fluids. Enclosed porosity causes no problems unless present in excess where it can cause structural failure. Other similar defects often encountered in the foundry include cold laps, cracks, blow holes, and inclusions all of which are often referred to, incorrectly, as forms of porosity. Frequently examination of a casting rejected for leakage and marked by the inspector as porous, reveals that it actually has a cold lap, crack or a blow hole.

Various method of sealing porosity employed over the years include plugging, coating with epoxy resin, and welding. All of these techniques are highly labour intensive and therefore expensive, and there is no guarantee that the treatment will be successful.

A straightforward method in common use employs a solution of a high molecular weight polymer. The cleaned components are simply dipped into the solution for several minutes and on removal and subsequent evaporation of the solvent sealing is accomplished. This technique is not suitable for use on highly machined components that are to meet tight dimensional tolerances due to the thin film of polymer left on the surfaces. In addition any surface treatments such as conversion coating, anodic or chemical, that are called for, must be carried out prior to dipping. As penetration is limited and incomplete filling of the pores with resin is an inescapable consequence of employing solvent, more than one treatment may be required and tightness of the casting at high pressures must not be expected.

The process of vacuum impregnation came into use some twenty five years again and over this period many types of sealants have been used, all with varying degrees of success, from "Bakelite" TM varnish to sodium silicate and a wide range of polyesters. Modern processes of this type employ specially tailored unsaturated polyesters that have high penetration power in combination with low viscosity monomers such as styrene. Typically, the unsaturated polyesters are reaction products of phthalic anhydride and maleic anhydride with propylene glycol. A combination of inhibitors and catalysts is chosen to stabilise the viscosity of the impregnant during production runs and to give suitable curing at temperatures in the region of 130° C. Cross linking of the linear polyester by styrene results in a hard, solvent resistant resin which completely fills the pores. A typical manufacturing process involves placing the cleaned, cold castings in an autoclave and subjecting them to a vacuum of not less than 12.7 mms of Hg for a minimum of 20 minutes. At this point the impregnant is admitted to the autoclave and brought to a level approximately two inches above the castings. Pressure of 90 to 100 lbs. per sq. in. is then applied to the autoclave for 30 minutes or more.

The impregnant fluid is then returned to the storage tank to allow the removal of the castings and their transfer to the wash tank for the removal of the surface film left by the sealant. After a short draining period, the parts are submerged in an oil for 45-60 minutes at 130° C. or alternatively placed in a hot air recirculation oven for 1½ hours. The final steps are to transfer the parts to a fresh water rinse to remove surface contamination. With this existing method of treatment pressure tightness of up to 12,000 lb. per sq. in. can be obtained within a temperature range of −40° C. to +250° C.

Other systems include anaerobically curing impregnants e.g. of the type described in U.K. Patent Specification No. 1,297,103.

The present invention has been particularly developed for use with impregnants of the type described in U.K. Patent Specification No. 1,547,801 but is not limited thereto. Such impregnants cure thermally at a temperature of about 90° C. and are thus conveniently cured by contacting the casting with hot water, either in the form of a bath or in the form of a spray.

Impregnation processes previously used have been batch processes but these are not altogether convenient e.g. in the treatment of cylinder blocks for motor vehicles. It is however possible to treat metal castings individually. This generally necessitates blocking off of the casting and pressurising with impregnant from within, or drawing a vacuum and submerging the casting in the impregnant. Neither of these two ways is highly desirable because of the inherent problems of sealing up the openings in the casting.

SUMMARY OF THE INVENTION

According to the present invention, an article to be impregnated is placed on a base plate or other support member, a cover such as a cylinder is placed over it in sealing relation with the base plate (in the manner of a bell jar), vacuum (i.e. subatmospheric pressure) is applied to the upper part of the cylinder to remove air from the pores (e.g. for 30 seconds or more), impregnant is admitted (preferably through the base plate) under the action of the vacuum until it at least covers the pores, the vacuum is broken, excess impregnant is removed from the cover (preferably by gravity drainage), and the cover is removed from the base plate.

The casting may then be removed from the base plate and placed on a conveyor for further treatment e.g. a cold water wash and a hot water spray in the case of the impregnant described in Specification No. 1,547,801.

The whole system can easily be automated. Where high production requirements are needed, a multi-station system could be designed on a carousel principal. For instance, a ten station unit giving a two minute cycle for each casting would give a production rate of four to five castings per minute. On the other hand, a single stage unit could prove most useful to jobbing foundries who have an occasional use for impregnation.

BRIEF DESCRIPTION OF THE DRAWINGS

Embodiments of apparatus for carrying out the invention is illustrated in the accompanying drawings in which.

DESCRIPTION OF THE PREFERRED EMBODIMENTS

Figure 1:
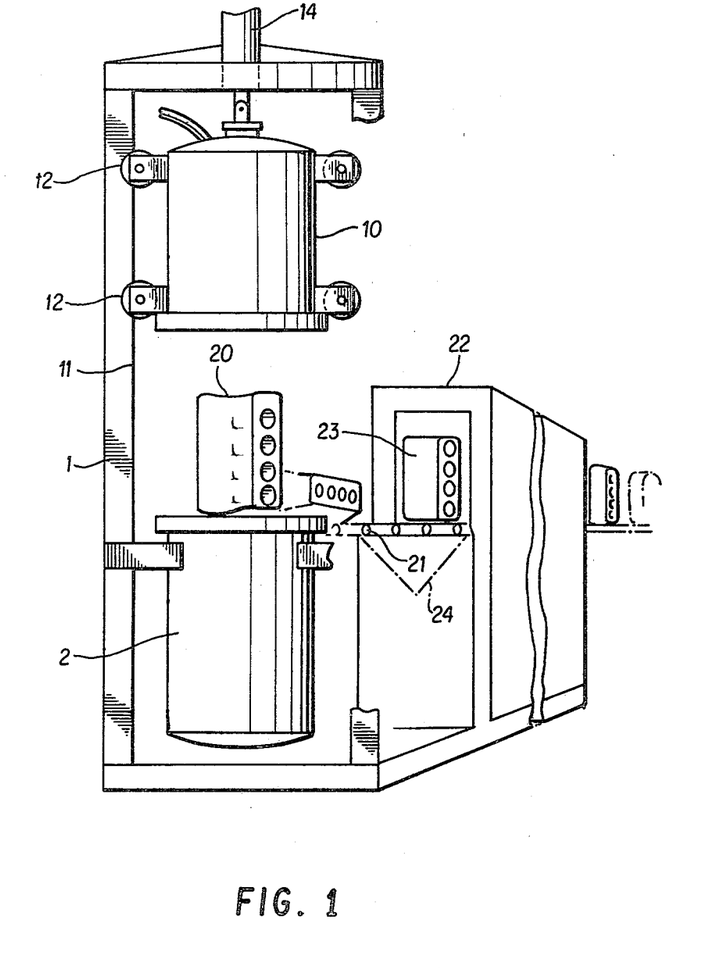
FIG. 1 is a side elevation of the apparatus.
Figure 2:
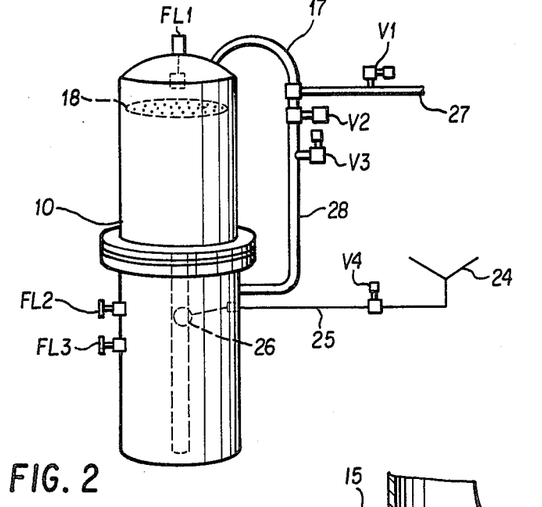
FIG. 2 is a diagrammatic view of part of FIG. 1 showing the piping.

The apparatus comprises an upright frame 1 carrying an impregnant reservoir cylinder 2 which in turn carries a dished base plate 3 (see FIG. 3) at its upper end. The upper rim of cylinder 2 has an inward flange 4 which is bolted to a similar flange 5 of plate 3 by bolts (not shown) with a seal 6 interposed. The centre of the plate 3 is apertured and a dip tube 7 depends from the aperture into the body of cylinder 2. Frame 1 also carries a cover in the form of a bell jar 10 which moves vertically on a track 11, the bell jar being provided with suitable rollers or wheels 12 which run in the track 11. A second track on the opposite side of the bell jar 10 will be present in practice but has been omitted from the drawing. The position of the bell jar 10 in the horizontal plane is thus exactly determined. The bell jar 10 is moved vertically by an air cylinder 14 and it has a flange 15 and seal 16 which mate with flange 5 of the base plate. As shown in FIG. 2, the bell jar 10 has a float switch FL1 and vacuum line 17 at its upper end. It also has a perforated grid 18 near the top. Cylinder 2 has maximum and minimum level float switches FL2 and FL3 to maintain a predetermined level of liquid impregnant (during the rest part of the cycle). As shown in FIG. 1, an impregnated casting 20 is turned on its side after impregnation is completed and is passed over rollers 21 to a hot water tunnel 22 where it is sprayed with hot water from jets 23. The temperature of the water is, for example, 70° to 90°, depending on the impregnant used. As the casting 20 moves over rollers 21, excess impregnant drops onto drain tray 24 and may be returned via line 25 and valve V4 to cylinder 2 e.g. via a ball valve 26 (FIG. 2). In the first part of tunnel 22 the hot water gradually raises the casting to curing temperature and (assuming the impregnant contains surfactant) washes excess impregnant from the casting.

Vacuum line 17 is connected both to a vacuum pump line 27 leading to a vacuum pump (not shown) and a cylinder line 28 leading to the upper end of cylinder 2. Line 27 has an exhaust valve V1 connected to atmosphere and closable by a solenoid A1, and line 28 has a shut-off valve V2 and an exhaust valve V3 connected to atmosphere and located below valve V2.

Briefly, a casting 20 is placed on base plate 3; bell jar 10 is lowered by cylinder 14 into sealing relation with the base plate 3; a 5 millibar vacuum is drawn in lines 27, 17 and 28 (V2 being open) and thus in cylinder 2 and bell jar 10 and is held for one minute to effect degassing of casting 20; V2 is closed and V3 is slightly opened so that air pressure rises at the top of cylinder 2 and forces impregnant up dip tube 7 to fill the bell jar 10 up to the point when float switch FL1 operates; FL1 breaks the vacuums in lines 17 and 28 by appropriately operating valves V1, V2 and V3 and impregnant drains back to cylinder 2 via dip tube 7; and air cylinder 14 lifts bell jar 10 so that impregnated casting 20 can be removed.

It will be noted that by evacuating both bell jar 10 and cylinder 2 simultaneously, flow of impregnant into bell jar 10 can be accurately controlled by using an air valve thus avoiding blockage problems which might arise if flow of impregnant was directly controlled by a liquid valve.

In an alternative embodiment (not shown), a hot air convection oven is used to effect the cure. This avoids the need to treat contaminated water and in some cases it is possible to recover impregnant by condensation from waste gases.

The vacuum used is, as indicated, about 5 millibars; vacuums of 10 millibars and above have tended to give inferior sealing in certain cases and vacuums below 4 millibars tended to lead to "popping" of the impregnant. However, vacuums of up to 50 millibars could be used for many components but the fast times used make lower vacuums desirable.

During the suck-up period a relatively high vacuum is maintained in the reservoir cylinder 2 to ensure a steady transfer. In the bell jar, the impregnation pressure of 5-10 millibars is maintained right up to the time FL1 is operated.

A further advantage of using the admission of air pressure to force the impregnant into the bell jar is that the impregnant in the reservoir is already under vacuum and thus degassed; thus foaming problems on admission to the autoclave are substantially eliminated. During evacuation, it is desirable to admit a small amount of air into the lower end of the reservoir to agitate the impregnant for degassing purposes. This can be done simply by providing an air line with a flow control regulator which admits a small amount of air during evacuation. Of course the air should be admitted at a point well away from dip tube 7 to prevent it reaching the bell jar. With such an arrangement, it may not be necessary to provide an exhaust valve 3 since when valve V2 is closed the pressure in cylinder 2 will gradually rise.

Referring now to FIGS. 4–12, FIG. 4 shows a bell jar 50 in its lower position in solid lines and in its upper position in ghost lines. It is carried in by two upper arms 51 and two lower arms 52 (see FIGS. 4, 6 and 7) each of which carries an inner wheel 53 and an outer wheel 54 which run on respective opposite faces of a post 55. A bridge member 56 interconnects upper arms 51 and is connected by a pivotal joint 57 to the upper end of a rod 58 of an air cylinder 59. The air cylinder 59 is carried by the machine frame at its lower end in such a way as to permit some pivotal movement. It will thus be seen that the bell jar is accurately guided for vertical movement under the action of the air cylinder 59 and in its lower position it cooperates with an apertured plate 60 of the track arrangement as described below.

Figure 5:
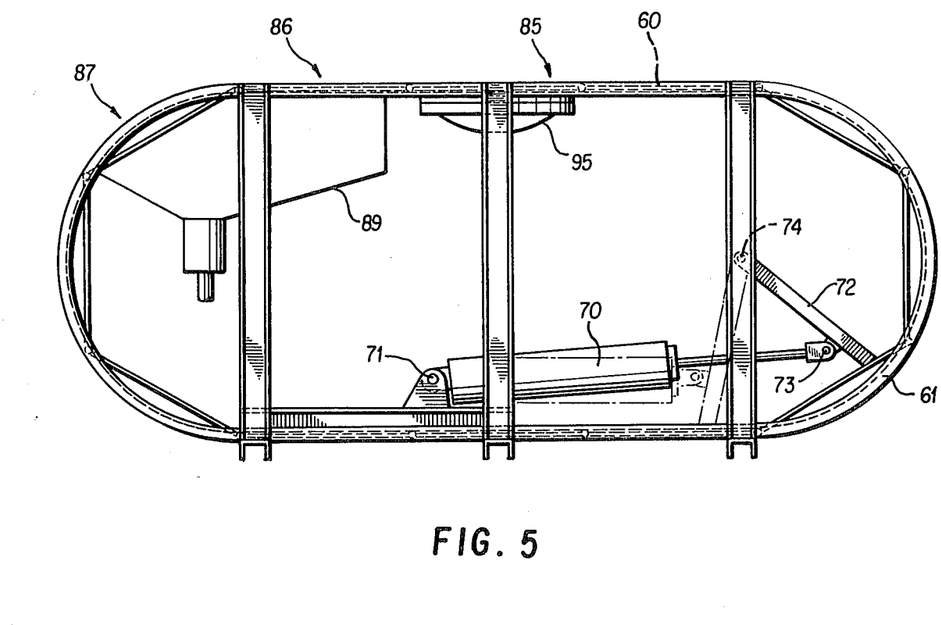
FIG. 5 shows a front elevation of the track arrangement of the apparatus of FIG. 4.
Figure 6:
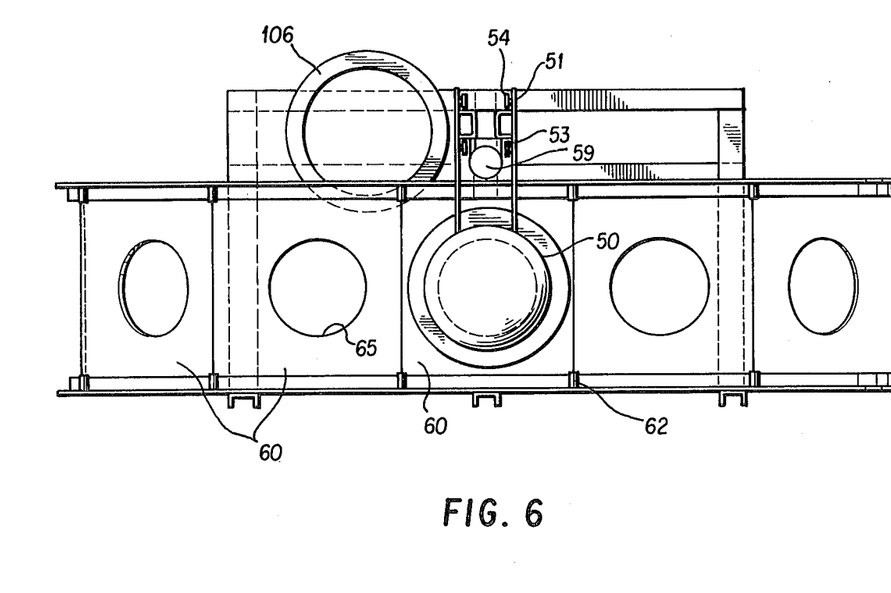
FIG. 6 shows a plan view of the track arrangement and lower part of the apparatus of FIG. 4.
Figure 7:
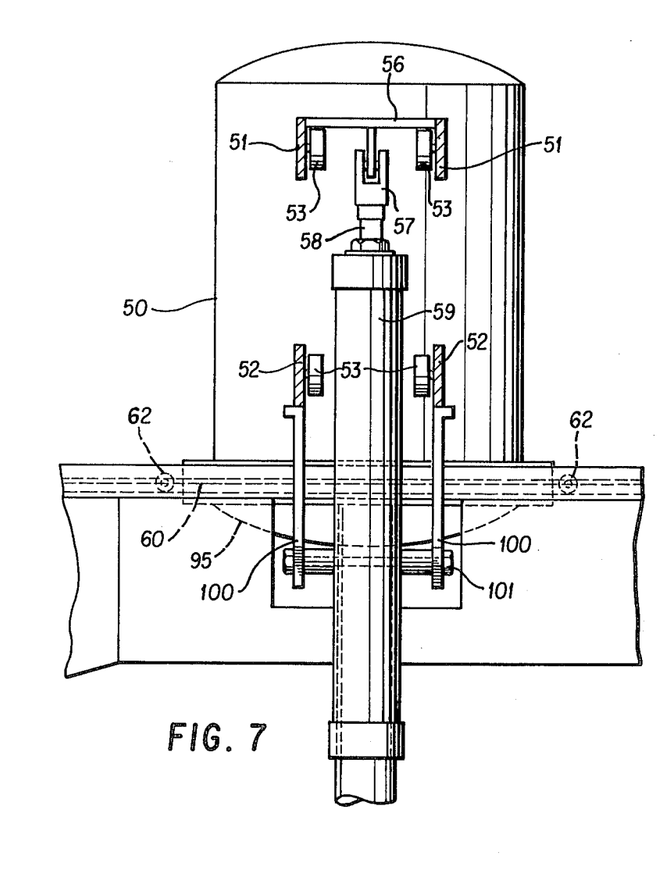
FIG. 7 is a view taken on line VII—VII of FIG. 4.
Figure 8:
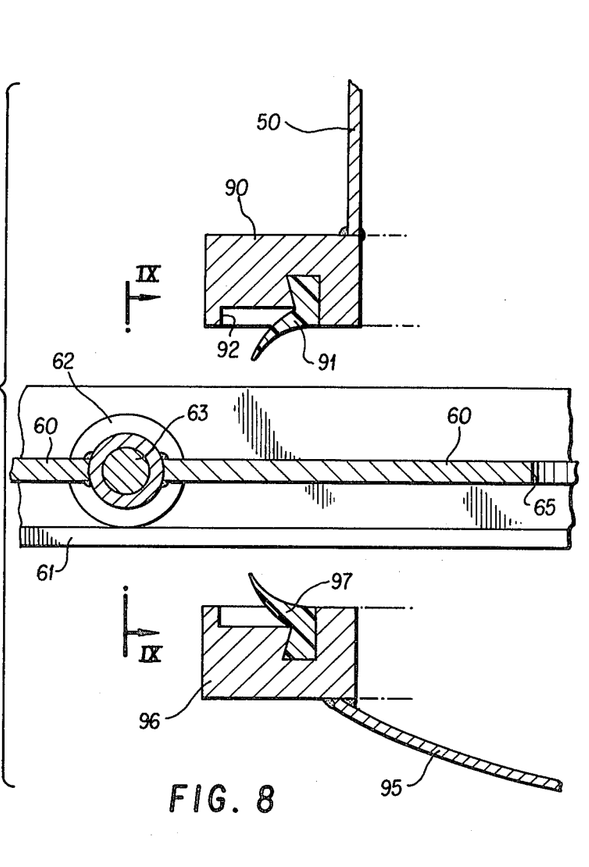
FIG. 8 is a detail view corresponding to the top central part of FIG. 5 and shows similar parts to those shown in FIG. 3.
Figure 9:
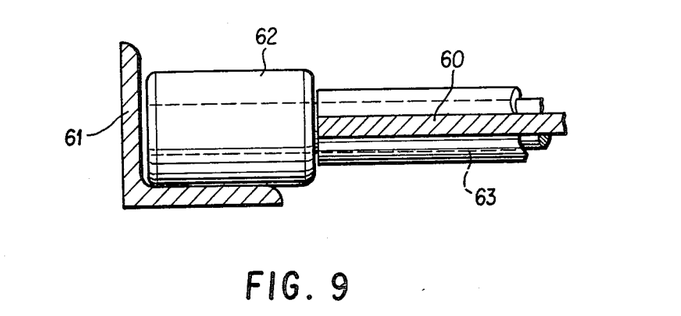
FIG. 9 is a section on the line IX—IX of FIG. 8 showing a wheel and a hinge.
Figure 10:
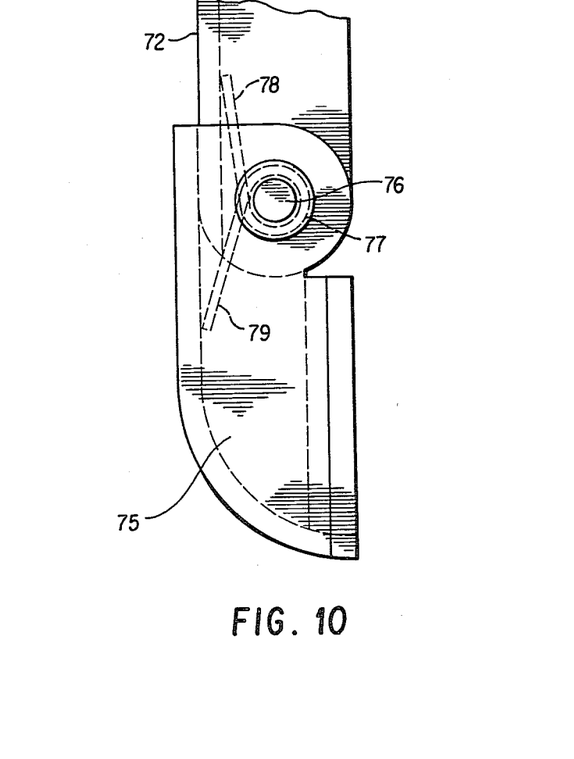
FIG. 10 shows a detail from the right hand end of FIG. 5.

Referring in more detail to FIGS. 5–10, the drawings show a track arrangement with fixed L-section parallel rails 61 at each side, the rails 61 forming a closed loop as shown in FIG. 5. Running on these rails are a pair of wheels 62, each pair being carried by a transverse spindle 63 extending between the rails 61. Apertured plates 60, each having a circular aperture 65, are pivotally connected between the spindles 63 to provide a track arrangement similar to that of a track-laying vehicle. As shown there are 12 plates 60 which are indexed around the track in a counterclockwise (referring to FIG. 5) direction so that each in turn is below bell jar 50. The indexing arrangement comprises an air cylinder 70 pivotally secured to the machine frame at one end 71 and pivotally secured to a lever 72 at the other end 73. The lever 72 hangs downwards from a pivot 74 and can be swung between the two indicated positions by retracting and extending the air cylinder 70. FIG. 10 shows the lower end of lever 72 and it will be seen that the lever 72 has a pusher member 75 pivoted thereto by means of a pin 76. The pusher member 75 is of channel section at its upper end and engages the back of lever 72 so that rotation in a counterclockwise direction is prevented. A helical spring 77 is loosely mounted on the pin 76 and has end arms 78, 79 which respectively engage the lever 72 (which is also channel-shaped) and the pusher member 75 so that although the pusher member 75 can move counterclockwise it is resiliently biassed back to the FIG. 10 position. When the air cylinder 70 is extended pusher member 75 engage the forward edge of the aperture in a plate 60 and moves all the plates 60 forward by one twelfth of the length of the track. When the air cylinder is retracted (after the operative plate 60 has been clamped in position as hereinafter described), the pusher member 75 rides over the rear edge of the aperture in the plate 60 by virtue of its resilient mounting. A drainage sump 89 is provided beneath the two plate index positions 86, 87 following the operative position 85. Any impregnant draining through the hole in the plate can thus be recovered, though the castings will normally be unloaded at position 86 and 87.

To provide a sealed autoclave, the bell jar 50 has a flange 90 provided with a resilient annular lip seal 91 in a recess 92 therein, the lips being arranged to prevent ingress of air. This lip seal 91 engages the upper side of the plate 60 at position 85 and the autoclave is closed by a dished plate 95 having a flange 96 with a similar lip seal 97. The plate 95 is lifted so that lip seal 97 engages the lower face of plate 60 and a sealed autoclave is formed (see FIGS. 4 and 7). This lifting is effected automatically by the lowering of the bell jar 50. A pair of L-shaped levers 100 are pivoted to the machine frame at 101 and are pivotally connected to depending lugs 102 on the dished plate 95 at one end. At the other end they have abutment flanges 103 which engage the lower bell jar arms 52 when the bell jar 50 is approaching its lowermost position. A flexible impregnant transfer pipe 105 connects an opening in the centre of the dished plate 95 with an impregnant reservoir cylinder 106.

Figure 11:
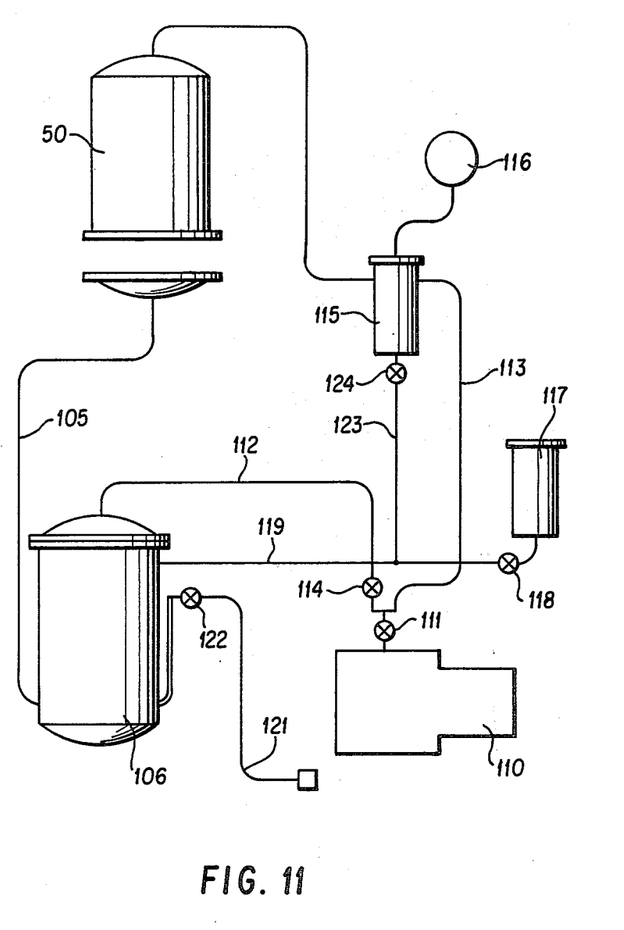
FIG. 11 shows a schematic pipe and valve arrangement for the second embodiment.

Referring now to FIG. 11, the vacuum pump 110 has a main valve 111 leading to lines 112 and 113. Line 112 leads via a valve 114 to cylinder 106 and line 113 leads to bell jar 50 via a resin catch pot 115 equipped with a pressure gauge 116. Air can be admitted to cylinder 106 via a non-return valve 117, a control valve 118 and line 119. Line 121 is connected to the drainage sump 89 via a filter and collected impregnant may be sucked into cylinder 106 when valve 122 is opened. Similarly a line 123 controlled by a valve 124 serves to periodically drain the catch pot 115. The operation of the valve is similar to that previously described with reference to FIGS. 1–3.

Figure 12:
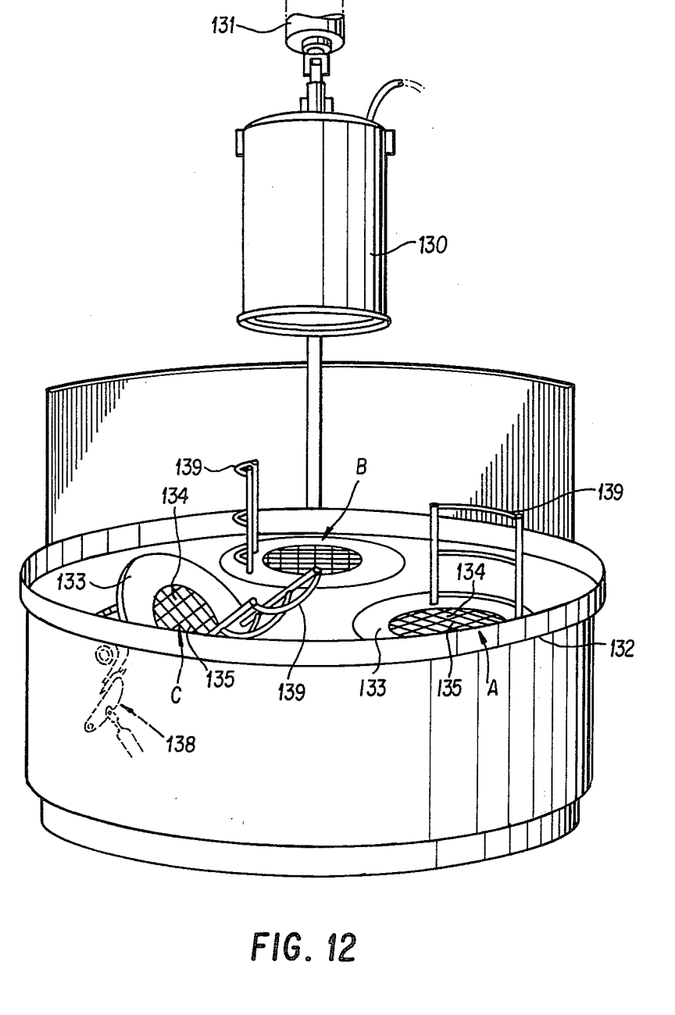
FIG. 12 is a general view of a third embodiment.

Turning now to FIG. 12, a bell jar 130 is carried by an air cylinder 131 and runs on a suitable vertical rail (not shown). A turntable 132 therebelow has three plates 133 pivotably mounted therein, each with a central aperture 134 protected by a grid 135. These can be indexed through three positions, a loading and unloading position A, impregnation position B and a drain position C. A tilt mechanism shown generally at 138 serves to facilitate drainage of an impregnated casting the casting resting against an arcuate rail 139 attached to the plate 133. In other respects this embodiment of the invention is similar to the embodiments of the invention previously described. However the lower dished plate (not shown) is lifted by a pneumatic cylinder or hydraulic ram.

Figure 3:
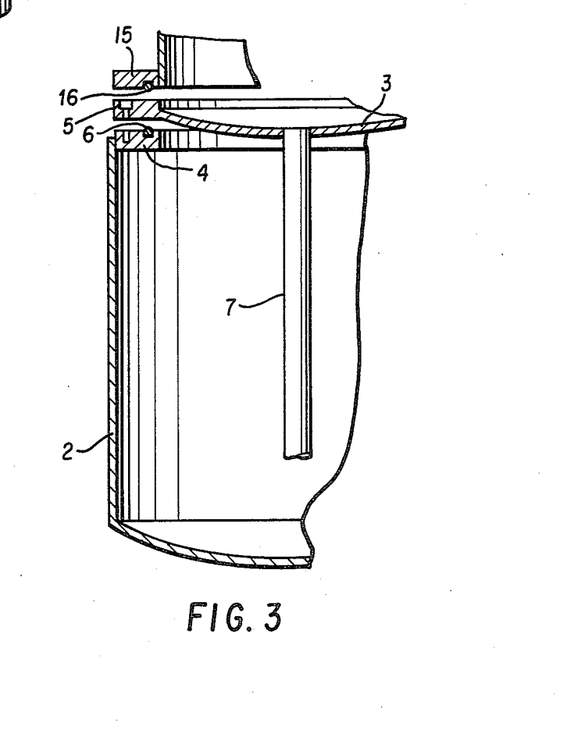
FIG. 3 is a detail view showing the peripheral seal in cross-section.
Figure 4:
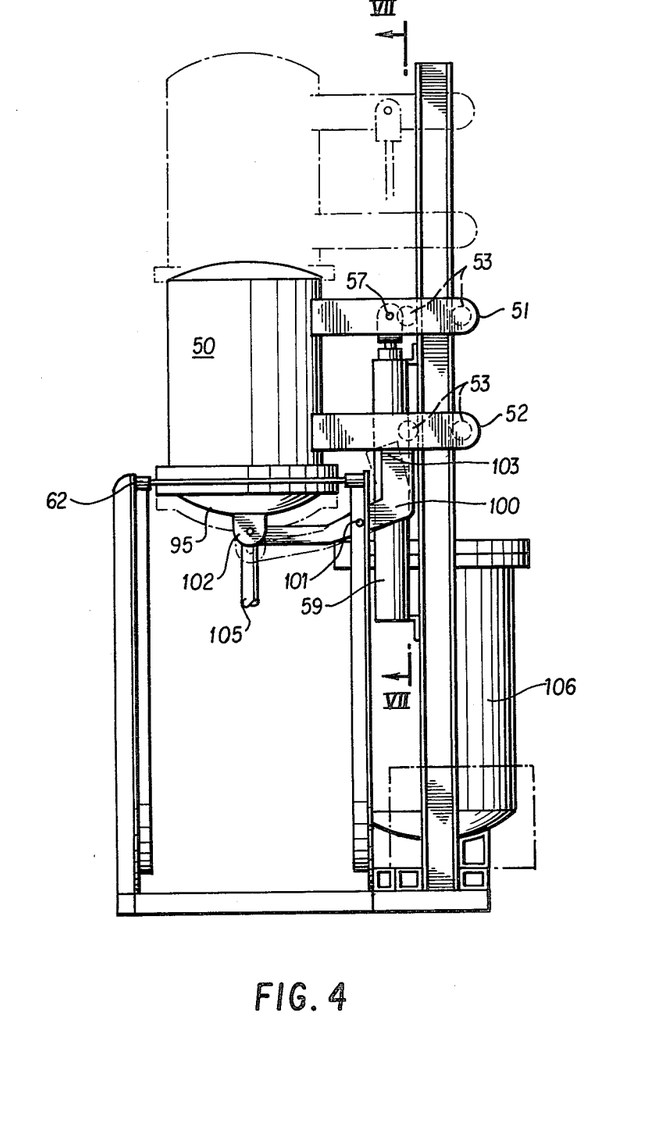
FIG. 4 shows an end elevation of a second embodiment of the apparatus of the invention.

The washing and curing steps have not been described in relation to FIGS. 4–12; these could be as described with reference to FIGS. 1–3 or conventional apparatus and techniques may be used.

Further indexing positions could be used to provide for e.g. centrifuging after impregnation or washing and curing. This would be convenient when using rigs connected to the plates for holding a number of small components.

It will be seen that the apparatus and process described above provide a dry vacuum; in other words, the vacuum is drawn before the article is submerged in the impregnant. This is quicker and more efficient than a wet vacuum system where the article is first submerged in impregnant. The former process may for example have a cycle time of 2½ minutes and the latter a cycle time of 10 minutes.

I claim:

1. A method of impregnating a porous article in a pressure vessel connected to a impregnant-containing reservoir, comprising the steps of:
   applying a reduced pressure to both the pressure vessel and the reservoir; and
   allowing the pressure in the reservoir to rise by admission of air to the reservoir, to force a portion of the impregnant into the pressure vessel whereby said porous article is impregnated by said portion of said impregnant.

2. A method of impregnating a porous article which comprises placing the article on a support comprising a base surface through which impregnant may be admitted to the chamber, placing a cover over the support in sealing relation with the support to define an impregnation chamber, applying a reduced pressure to the cover at the upper part thereof, and also to an upper part of an impregnant reservoir, supplying impregnant to the chamber until it at least covers the pores by admitting air to the reservoir, allowing the pressure in the chamber to rise to substantially atmospheric thereby removing excess impregnant from the chamber, and removing the cover from the support.

3. A method according to claim 2 wherein the base surface is dished to facilitate drainage of the impregnant.

4. A method according to claim 2 or 3 wherein the support comprises a horizontally movable apertured member which can carry the article forwards and the base surface is provided by a member which can be clamped against the underside of the apertured member.

5. A method according to claim 2, wherein impregnant in the reservoir is stirred by admitting air into a lower region thereof.

6. A method according to claim 2 wherein the article is subjected to a further treatment which includes a hot water spray to effect curing of the impregnant.

7. Apparatus for impregnating a porous article in a pressure vessel connected to an impregnant-containing reservoir said apparatus comprising:
   means for selectively reducing the pressure in both the reservoir and the pressure vessel;
   means for selectively admitting air to the reservoir and to the pressure vessel wherein said means for selectively admitting air to the reservoir and to the pressure vessel is operated after the operation of said means for selectively reducing the pressure and whereby said means for selectively admitting air forces a portion of the impregnant into the pressure vessel so that said porous article is impregnated by said portion of said impregnant.

8. Apparatus for impregnating a porous article, comprising a support for the article including a base surface through which impregnant may pass to reach the article, a cover, means for moving the cover between an upper position at which the article may be placed in position beneath the cover and a lower position in which the cover is in sealing relation with the support and defines an impregnation chamber, an impregnant reservoir associated with the support, and means for simultaneously applying reduced pressure to the upper part of the cover and the upper part of the reservoir, for admitting air to the reservoir to flood the impregnation chamber and for admitting air to the impregnation chamber to drain it.

9. Apparatus according to claim 8, which includes means for admitting a small amount of air into the lower part of the reservoir to stir the impregnant.

10. Apparatus according to claim 8 or 9 wherein the support comprises a base surface which is dished to facilitate drainage of the impregnant.

11. Apparatus according to claim 8 or 9 wherein the support comprises a horizontally movable apertured member which can carry the article forwards and the base surface is provided by a member which can be clamped against the underside of the apertured member.

* * * * *